United States Patent
Watson

(10) Patent No.: US 9,249,339 B2
(45) Date of Patent: Feb. 2, 2016

(54) AUTO RECONDITIONING SOLUTION

(71) Applicant: Matthew Watson, Severna Park, MD (US)

(72) Inventor: Matthew Watson, Severna Park, MD (US)

(*) Notice: Subject to any disclaimer, the term of this patent is extended or adjusted under 35 U.S.C. 154(b) by 0 days.

(21) Appl. No.: 14/585,970

(22) Filed: Dec. 30, 2014

(65) Prior Publication Data

US 2015/0210893 A1    Jul. 30, 2015

Related U.S. Application Data

(60) Provisional application No. 61/921,559, filed on Dec. 30, 2013.

(51) Int. Cl.
*C09G 1/06* (2006.01)
*C09G 1/18* (2006.01)

(52) U.S. Cl.
CPC .................................. *C09G 1/18* (2013.01)

(58) Field of Classification Search
CPC ... C08L 91/005; C08L 91/06; C09D 191/005; C09D 191/06; C09G 1/06; C09G 1/14; C09G 1/18
USPC ........................ 106/9, 11, 253, 265
See application file for complete search history.

(56) References Cited

U.S. PATENT DOCUMENTS

| | | | |
|---|---|---|---|
| 2,189,530 A | 2/1940 | McCreery | |
| 2,873,200 A | 2/1959 | Greenlee | |
| 2,893,964 A | 7/1959 | Wilder | |
| 2,975,129 A | 3/1961 | Taylor | |
| 5,098,472 A | 3/1992 | Watkins et al. | |
| 7,462,226 B2 * | 12/2008 | Maeda et al. | 106/14.22 |
| 8,337,995 B2 * | 12/2012 | Wu et al. | 428/532 |
| 2005/0238898 A1 * | 10/2005 | Wind et al. | 428/480 |
| 2007/0037001 A1 | 2/2007 | Gao et al. | |
| 2008/0017068 A1 * | 1/2008 | Sokol et al. | 106/271 |
| 2011/0262759 A1 * | 10/2011 | Wu et al. | 428/480 |
| 2012/0328892 A1 * | 12/2012 | Wu | 428/524 |
| 2014/0196631 A1 | 7/2014 | McDaniel | |

FOREIGN PATENT DOCUMENTS

WO    87/07627    12/1987
WO    2009/155115    12/2009

* cited by examiner

*Primary Examiner* — Anthony J Green
(74) *Attorney, Agent, or Firm* — Whiteford, Taylor & Preston, LLP; Gregory M. Stone

(57) ABSTRACT

A chemical formulation for cleaning and treating plastic and other surfaces comprises linseed oil in a concentration of 43%-59% wt.; mineral spirits in a concentration of 41%-57% wt.; and carnauba wax in a concentration of 2%-10% wt. A method of using the chemical formulation comprises applying it the composition to a surface.

16 Claims, No Drawings

AUTO RECONDITIONING SOLUTION

CROSS-REFERENCE TO RELATED APPLICATIONS

This application claims priority under 35 U.S.C. 119(e) of U.S. provisional application Ser. No. 61/921,559 filed on Dec. 30, 2013, entitled Auto Reconditioning Solution, which is incorporated herewith by reference in its entirety.

BACKGROUND

1. Field of the Invention

The invention relates to the field of cleaning and polishing solutions. More specifically, this invention relates to a solution for the treatment of various surfaces.

2. Background

Solutions for protection of plastic, painted, and other surfaces have been developed in the past. For example, U.S. Pat. No. 2,189,530 teaches a composition that comprises 7.38% carnauba wax, 66.07% linseed oil, and 26.55% mineral spirits. Other solutions include different ratios of similar elements. For example, United States Patent Application Publication Serial Number 2007/0037001 discloses compositions with wax/linseed oil ratios of 100:1 or 1:100, preferably 10:1 or 1:10, in addition to mineral spirits. None of the compositions described in the prior art, however, provide a formulation that has the desired durability and consistency. For example, linseed oil remains in liquid form and is slippery and greasy for too long to have any practical uses. This causes dust and dirt to stick to such solution and impractical to apply to certain surfaces that are required to be stood on or gripped. Such products become discolored and wear off easily when they come in contact with water. Finally, excess of such compositions are difficult to remove because they smear all over the surface upon which they are applied.

SUMMARY OF THE INVENTION

It is one objet of the present invention to provide a formulation that is easy to apply by in the form of a semi-solid composition. It prevents accumulation of dirt when applied to a surface. It also remains in its natural state without discoloration when coming in contact with water.

In one embodiment, a formulation a chemical formulation comprises linseed oil in a concentration of 43%-59% wt; mineral spirits in a concentration of 41%-57% wt; and carnauba wax in a concentration of 2%-10% wt.

In an alternative embodiment, a method for manufacturing a chemical formulation, comprises various steps. In one step, linseed oil is mixed with mineral spirits thoroughly until complete homogenized and brought to a temperature between 68 F to 92 F. In another step, carnauba wax is added and liquefied by bringing the temperature of the mixture to 85 F to 95 F. In a final step, the linseed oil, mineral spirits, and carnuba wax are mixed. The resulting solution comprises linseed oil in a concentration of 43%-51% wt; mineral spirits in a concentration of 41%-57% wt, and carnauba wax in a concentration of 2%-10% wt.

One further embodiment provides a method for using a chemical formulation. One step of the method comprises applying a formulation to a surface. The formulation comprises linseed oil in a concentration of 43%-51% wt; mineral spirits in a concentration of 41%-57% wt, and carnauba wax in a concentration of 2%-10% wt.

DETAILED DESCRIPTION

The invention summarized above and defined by the enumerated claims may be better understood by referring to the following description. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

The following description relates to a solution for cleaning and treating various surfaces. It is understood that a person of ordinary skill in the art will recognize other inherent features of the solution described herein, which come within the scope of the disclosed invention.

In one exemplary embodiment, the formulation comprises at least three compounds and or chemicals in the following proportional ranges:

| | |
|---|---|
| Boil Linseed Oil | 43%-59% (preferably 45% to 55%, more preferably 47.06%) |
| Odorless Mineral Spirits | 41%-57% (preferably 40 to 50%, more preferably 47.04%) |
| Carnauba Wax | 2%-10% (preferably 5.90%) |

A person of ordinary skill in the art would recognize that other compounds may be added to the solution for various purposes, e.g., fragrances and scents, other compounds required for safety or to allow the solution to last longer.

In one preferred embodiment, the formulation remains in the surface without signs of breaking down for at least 180 days after application without leaving residue, when applied to thermal plastics. In other preferred embodiments the solution remains in the surface without signs of breaking down for a period of 90 to 180 days when applied to thermal plastics. In one preferred embodiment, the formulation remains in the surface without signs of breaking down for at least 60 days after application without leaving residue, when applied to scratch and chips in multistage paint with clear coat metals surfaces such as aluminum, copper, bronze, and others. In other preferred embodiments the solution remains in the surface without signs of breaking down for a period of 7 to 60 days when applied to scratch and chips in multistage paint with clear coat or metals surfaces such as aluminum, copper, bronze, and others.

In one preferred embodiment, the formulation remains in the surface without signs of breaking down for at least 90 days after application without leaving residue, when applied to single stage paint, such as a gel coat. In other preferred embodiments the solution remains in the surface without signs of breaking down for a period of 30 to 90 days when applied to single stage paint, such as a gel coat.

Surprisingly, when the mixture is applied like a protectant leaving a thin layer on the surface, it creates a barrier protecting the surface and giving the appearance of a restored finish. In addition, when it is applied to a scratch or chip the mixture fills in the damage area and dries clear mimicking the surrounding clear coat. In order to achieve such results a person of ordinary skill would expect that a new coat of paint would be required.

The solution described above is manufactured utilizing the following steps, which result in an appropriate composition for use. First, the boiled linseed oil and odorless mineral spirits are mixed thoroughly until complete homogenized and brought to a temperature of preferably 74 F (range of 68 F to 92 F). Then, the carnauba wax is liquefied by bringing it to a temperature of preferably 90 F (range of 85 F to 95 F). Finally, the mixed linseed oil, mineral spirits, and carnauba wax are thoroughly mixed. It is contemplated that other steps could be utilized in manufacturing the solution and including additional components.

The disclosed solution can be applied with various textile or foam pad applicators or towels. Application and can also be done with foam brushes and spray bottles. Application process varies depending on the surface to be treated. It is contemplated that many different surfaces can be treated, including thermal and or molded plastics, all painted surfaces including single stage and multi-stage paint, metals including but not limited to aluminum and copper, leather, vinyl, fiberglass, acrylic, rubber, finished wood, unfinished wood, vinyl and or plastic film. The formulation can also be used to fill in chips and scratch in clear coat finishes, translucent plastics, and epoxy or varnished finishes.

EXAMPLES

The following table shows examples of the formulation described above including its functionality and durability:

| | 1 hour | 2 hours | 24 hours | 7 days | 30 days | 60 days | 90 days | 120 days | 180 days | Notes: |
|---|---|---|---|---|---|---|---|---|---|---|
| Ratios of Mixture/Application Date/Avg. Daily Temperature/Cure Time: 32.5% BLO 32.5% OMS 35.0% CW/34 F./6 hours | | | | | | | | | | |
| Thermal Plastic | P | P | P | F | F | F | F | F | F | left residue |
| Scratch and Chips in multistage paint with clear coat | P | P | P | F | F | F | F | F | F | |
| Metal Surfaces (Aluminum, copper, bronze, etc.) | P | P | P | F | F | F | F | F | F | |
| Single Stage paint (gel coat, etc.) | P | P | P | F | F | F | F | F | F | |
| Ratios of Mixture/Application Date/Avg. Daily Temperature/Cure Time: 35.0% BLO 35.0% OMS 30.0% CW/34 F./6 hours | | | | | | | | | | |
| Thermal Plastic | P | P | P | F | F | F | F | F | F | left residue |
| Scratch and Chips in multistage paint with clear coat | P | P | P | F | F | F | F | F | F | |
| Metal Surfaces (Aluminum, copper, bronze, etc.) | P | P | P | F | F | F | F | F | F | |
| Single Stage paint (gel coat, etc.) | P | P | P | F | F | F | F | F | F | |
| Ratios of Mixture/Application Date/Avg. Daily Temperature/Cure Time: 40.0% BLO 40.0% OMS 20.0% CW/34 F./6 hours | | | | | | | | | | |
| Thermal Plastic | P | P | P | P | F | F | F | F | F | |
| Scratch and Chips in multistage paint with clear coat | P | P | P | P | F | F | F | F | F | |
| Metal Surfaces (Aluminum, copper, bronze, etc.) | P | P | P | P | F | F | F | F | F | |
| Single Stage paint (gel coat, etc.) | P | P | P | P | F | F | F | F | F | |
| Ratios of Mixture/Application Date/Avg. Daily Temperature/Cure Time: 45.0% BLO 45.0% OMS 10.0% CW/34 F./6 hours | | | | | | | | | | |
| Thermal Plastic | P | P | P | P | P | P | P | P | P | |
| Scratch and Chips in multistage paint with clear coat | P | P | P | P | P | P | F | F | F | |
| Metal Surfaces (Aluminum, copper, bronze, etc) | P | P | P | P | P | F | F | F | F | |
| Single Stage paint (gel coat, etc) | P | P | P | P | P | P | P | P | F | |
| Ratios of Mixture/Application Date/Avg. Daily Temperature/Cure Time: 49.0% BLO 49.0% OMS 1.0% CW/34 F./6 hours | | | | | | | | | | |
| Thermal Plastic | P | P | P | P | P | P | P | P | P | left residue |
| Scratch and Chips in multistage paint with clear coat | P | P | P | P | P | P | F | F | F | |
| Metal Surfaces (Aluminum, copper, bronze, etc,) | P | P | P | P | P | F | F | F | F | |
| Single Stage paint (gel coat, etc,) | P | P | P | P | P | P | P | P | F | |
| Ratios of Mixture/Application Date/Avg. Daily Temperature/Cure Time: 49.5% BLO 49.5% OMS 1.0% CW/34 F./6 hours | | | | | | | | | | |
| Thermal Plastic | P | P | P | P | P | P | P | P | P | left residue |
| Scratch and Chips in multistage paint with clear coat | P | P | P | P | P | P | F | F | F | |
| Metal Surfaces (Aluminum, copper, bronze, etc.) | P | P | P | P | P | F | F | F | F | |
| Single Stage paint (gel coat, etc.) | P | P | P | P | P | P | P | F | F | |
| Ratios of Mixture/Application Date/Avg. Daily Temperature/Cure Time: 32.5% BLO 32.5% OMS 35.0% CW/63 F./2 hours | | | | | | | | | | |
| Thermal Plastic | P | P | P | F | F | F | F | F | F | left residue |
| Scratch and Chips in multistage paint with clear coat | P | P | P | F | F | F | F | F | F | |
| Metal Surfaces (Aluminum, copper, bronze, etc.) | P | P | P | F | F | F | F | F | F | |
| Single Stage paint (gel coat, etc.) | P | P | P | F | F | F | F | F | F | |
| Ratios of Mixture/Application Date/Avg. Daily Temperature/Cure Time: 35.0% BLO 35.0% OMS 30.0% CW/63 F./2 hours | | | | | | | | | | |
| Thermal Plastic | P | P | P | F | F | F | F | F | F | left residue |
| Scratch and Chips in multistage paint with clear coat | P | P | P | F | F | F | F | F | F | |
| Metal Surfaces (Aluminum, copper, bronze, etc.) | P | P | P | F | F | F | F | F | F | |
| Single Stage paint (gel coat, etc.) | P | P | P | F | F | F | F | F | F | |
| Ratios of Mixture/Application Date/Avg. Daily Temperature/Cure Time: 40.0% BLO 40.0% OMS 20.0% CW/63 F./2 hours | | | | | | | | | | |
| Thermal Plastic | P | P | P | P | F | F | F | F | F | |
| Scratch and Chips in multistage paint with clear coat | P | P | P | P | F | F | F | F | F | |
| Metal Surfaces (Aluminum, copper, bronze, etc.) | P | P | P | P | F | F | F | F | F | |
| Single Stage paint (gel coat, etc.) | P | P | P | P | F | F | F | F | F | |

-continued

|  | 1 hour | 2 hours | 24 hours | 7 days | 30 days | 60 days | 90 days | 120 days | 180 days | Notes: |
|---|---|---|---|---|---|---|---|---|---|---|
| Ratios of Mixture/Application Date/Avg. Daily Temperature/Cure Time: 45.0% BLO 45.0% OMS 10.0% CW/63 F./2 hours | | | | | | | | | | |
| Thermal Plastic | P | P | P | P | P | P | P | P | P | |
| Scratch and Chips in multistage paint with clear coat | P | P | P | P | P | P | F | F | F | |
| Metal Surfaces (Aluminum, copper, bronze, etc) | P | P | P | P | P | F | F | F | F | |
| Single Stage paint (gel coat, etc) | P | P | P | P | P | P | P | P | F | |
| Ratios of Mixture/Application Date/Avg. Daily Temperature/Cure Time: 49.0% BLO 49.0% OMS 2.0% CW/63 F./2 hours | | | | | | | | | | |
| Thermal Plastic | P | P | P | P | P | P | P | P | P | left residue |
| Scratch and Chips in multistage paint with clear coat | P | P | P | P | P | P | F | F | F | |
| Metal Surfaces (Aluminum, copper, bronze, etc.) | P | P | P | P | P | F | F | F | F | |
| Single Stage paint (gel coat, etc.) | P | P | P | P | P | P | P | P | F | |
| Ratios of Mixture/Application Date/Avg. Daily Temperature/Cure Time: 49.5% BLO 49.5% OMS 1.0% CW/63 F./2 hours | | | | | | | | | | |
| Thermal Plastic | P | P | P | P | P | P | P | P | F | left residue |
| Scratch and Chips in multistage paint with clear coat | P | P | P | P | P | P | F | F | F | |
| Metal Surfaces (Aluminum, copper, bronze, etc.) | P | P | P | P | P | F | F | F | F | |
| Single Stage paint (gel coat, etc.) | P | P | P | P | P | P | P | F | F | |
| Ratios of Mixture/Application Date/Avg. Daily Temperature/Cure Time: 32.5% BLO 32.5% OMS 35.0% CW/86 F./1 hours | | | | | | | | | | |
| Thermal Plastic | P | P | P | F | F | F | F | F | F | left residue |
| Scratch and Chips in multistage paint with clear coat | P | P | P | F | F | F | F | F | F | |
| Metal Surfaces (Aluminum, copper, bronze, etc.) | P | P | P | F | F | F | F | F | F | |
| Single Stage paint (gel coat, etc.) | P | P | P | F | F | F | F | F | F | |
| Ratios of Mixture/Application Date/Avg. Daily Temperature/Cure Time: 35.0% BLO 35.0% OMS 30.0% CW/86 F./1 hours | | | | | | | | | | |
| Thermal Plastic | P | P | P | F | F | F | F | F | F | left residue |
| Scratch and Chips in multistage paint with clear coat | P | P | P | F | F | F | F | F | F | |
| Metal Surfaces (Aluminum, copper, bronze, etc.) | P | P | P | F | F | F | F | F | F | |
| Single Stage paint (gel coat, etc.) | P | P | P | F | F | F | F | F | F | |
| Ratios of Mixture/Application Date/Avg. Daily Temperature/Cure Time: 40.0% BLO 40.0% OMS 20.0% CW/86 F./1 hours | | | | | | | | | | |
| Thermal Plastic | P | P | P | P | F | F | F | F | F | |
| Scratch and Chips in multistage paint with clear coat | P | P | P | P | F | F | F | F | F | |
| Metal Surfaces (Aluminum, copper, bronze, etc.) | P | P | P | P | F | F | F | F | F | |
| Single Stage paint (gel coat, etc.) | P | P | P | P | F | F | F | F | F | |
| Ratios of Mixture/Application Date/Avg. Daily Temperature/Cure Time: 45.0% BLO 45.0% OMS 10.0% CW/86 F./1 hours | | | | | | | | | | |
| Thermal Plastic | P | P | P | P | P | P | P | P | F | |
| Scratch and Chips in multistage paint with clear coat | P | P | P | P | P | F | F | F | F | |
| Metal Surfaces (Aluminum, copper, bronze, etc.) | P | P | P | P | P | F | F | F | F | |
| Single Stage paint (gel coat, etc.) | P | P | P | P | P | P | P | F | F | |
| Ratios of Mixture/Application Date/Avg. Daily Temperature/Cure Time: 49.0% BLO 49.0% OMS 2.0% CW/86 F./1 hours | | | | | | | | | | |
| Thermal Plastic | P | P | P | P | P | P | P | P | F | left residue |
| Scratch and Chips in multistage paint with clear coat | P | P | P | P | P | F | F | F | F | |
| Metal Surfaces (Aluminum, copper, bronze, etc) | P | P | P | P | P | F | F | F | F | |
| Single Stage paint (gel coat, etc.) | P | P | P | P | P | P | P | F | F | |
| Ratios of Mixture/Application Date/Avg. Daily Temperature/Cure Time: 49.5% BLO 49.5% OMS 1.0% CW/Aug. 15, 2012/86 F./1 hours | | | | | | | | | | |
| Thermal Plastic | P | P | P | P | P | P | P | P | F | left residue |
| Scratch and Chips in multistage paint with clear coat | P | P | P | P | P | F | F | F | F | |
| Metal Surfaces (Aluminum, copper, bronze, etc.) | P | P | P | P | F | F | F | F | F | |
| Single Stage paint (gel coat, etc.) | P | P | P | P | P | P | F | F | F | |

KEY:
BLO Boiled Linseed Oil
OMS Odorless Mineral Spirits
CW Carnauba Wax
P is for Pass where product shows same results as when first applied
F is for Fail where product shows visible signs of breaking down
Conclusions: The most effective ratio are equal parts BLO and OMS with 2% to 10% CW.
Conclusions: Different variations of BLO and OMS saw less effectiveness in overall durability. Effectiveness lost when BLO < 43% or OMS < 41%
Conclusions: Different variations of BLO and OMS saw less effectiveness in overall durability. Effectiveness lost when BLO > 59% or OMS > 57%
Conclusions: Exposure to direct sunlight decreased durability.
Conclusions: IDEAL = 47.06% BLO 47.04% OMS 5.90% CW The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A chemical formulation comprising:
   linseed oil in a concentration of 43%-59% wt.;
   mineral spirits in a concentration of 41%-57% wt.; and
   carnauba wax in a concentration of 2%-10% wt.

2. The chemical formulation of claim 1, wherein
   the linseed oil concentration is between 45%-55% wt.;
   the mineral spirits concentration is between 40%-50% wt.; and
   the carnauba wax concentration is between 2%-10% wt.

3. The chemical formulation of claim 1, wherein
   the linseed oil concentration is 47.06% wt.;
   the mineral spirits concentration is 47.04% wt.; and
   the carnauba wax concentration is 5.90% wt.

4. A method for manufacturing a chemical formulation, comprising:
   mixing linseed oil and mineral spirits thoroughly until completely homogenized and brought to a temperature between 68 F to 92 F;
   adding carnauba wax and liquefying the carnauba wax by bringing the temperature of the mixture to 85 F to 95 F; and
   mixing the linseed oil, mineral spirits, and carnauba wax; wherein the linseed oil has a concentration of 43%-59% wt; the mineral spirits in a concentration of 41%-57% wt, and carnauba wax in a concentration of 2%-10% wt.

5. The method of claim 4, wherein the temperature en for homogenization is 74 F.

6. The method of claim 4, wherein the temperature for liquefying the carnauba wax is 90 F.

7. The method of claim 4, wherein
   the linseed oil concentration is between 45%-55% wt.;
   the mineral spirits concentration is between 40%-50% wt.; and
   the carnauba wax concentration is between 2%-10% wt.

8. The method of claim 4, wherein
   the linseed oil concentration is 47.06% wt.;
   the mineral spirits concentration is 47.04% wt.; and
   the carnauba wax concentration is 5.90% wt.

9. The method of claim 4, further comprising applying said formulation to a surface, wherein the formulation is configured to remain on said surface after application without signs of breaking down for a period of at least 180 days, wherein the surface is a thermal plastic.

10. The method of claim 4, further comprising applying said formulation to a surface, wherein the formulation is configured to remain on said surface after application without signs of breaking down for a period of 90 to 180 days, wherein the surface is a thermal plastic.

11. A method for using a chemical formulation, comprising:
    applying a formulation to a surface, wherein the formulation comprises
    linseed oil in a concentration of 43%-59% wt.; mineral spirits in a concentration of 41%-57% wt.; and carnauba wax in a concentration of 2%-10% wt.

12. The method of claim 11, wherein
    the linseed oil concentration is between 45%-55% wt.;
    the mineral spirits concentration is between 40%-50% wt.; and
    the carnauba wax concentration is between 2%-10% wt.

13. The method of claim 11, wherein
    the linseed oil concentration is 47.06% wt.;
    the mineral spirits concentration is 47.04% wt.; and
    the carnauba wax concentration is 5.90% wt.

14. The method of claim 11, wherein the surface is selected from the group consisting of thermal and/or molded plastics, painted surfaces, leather, vinyl, fiberglass, acrylic, rubber, finished wood, unfinished wood, vinyl, and plastic film.

15. The method of claim 11, wherein the formulation is configured to remain on said surface after application without signs of breaking down for a period of at least 180 days, wherein the surface is a thermal plastic.

16. The method of claim 11, wherein the formulation is configured to remain on said surface after application without signs of breaking down for a period of 90 to 180 days, wherein the surface is a thermal plastic.

* * * * *